US006851314B2

(12) United States Patent  (10) Patent No.: US 6,851,314 B2
Bromley  (45) Date of Patent: Feb. 8, 2005

(54) APPARATUS AND METHOD FOR DETECTING A LEAK IN A SWIMMING POOL

(75) Inventor: John Bromley, Silver Springs, FL (US)

(73) Assignee: American Leak Detection, Inc., Palm Springs, CA (US)

(*) Notice: Subject to any disclaimer, the term of this patent is extended or adjusted under 35 U.S.C. 154(b) by 0 days.

(21) Appl. No.: 10/774,900

(22) Filed: Feb. 9, 2004

(65) Prior Publication Data

US 2004/0159143 A1 Aug. 19, 2004

Related U.S. Application Data

(62) Division of application No. 10/384,959, filed on Mar. 10, 2003, now abandoned, which is a division of application No. 10/006,556, filed on Dec. 4, 2001, now Pat. No. 6,532,814.
(60) Provisional application No. 60/251,367, filed on Dec. 5, 2000.

(51) Int. Cl.[7] .............................................. G01G 17/04
(52) U.S. Cl. ............................. 73/296; 73/4; 73/290 R; 73/309; 73/313
(58) Field of Search ........................ 73/40, 49.2, 290 R, 73/294, 296, 304 R, 309, 313; 340/605; 417/297.5, 320, 329, 423.3, 439

(56) References Cited

U.S. PATENT DOCUMENTS

| 3,538,746 | A | * | 11/1970 | Jacobs et al. ................. 73/49.2 |
| 3,889,523 | A | * | 6/1975 | Nolte .......................... 73/49.2 |
| 4,368,640 | A | * | 1/1983 | Tokarz ......................... 73/311 |
| 4,389,646 | A | | 6/1983 | Tago |
| RE31,884 | E | * | 5/1985 | Hansel et al. ................. 73/49.2 |
| 4,646,560 | A | | 3/1987 | Maresca, Jr. et al. |
| 4,686,718 | A | * | 8/1987 | Kinkead et al. ................. 4/508 |
| 4,736,622 | A | * | 4/1988 | Miller et al. .................. 73/49.2 |
| 4,751,841 | A | * | 6/1988 | Biard et al. ................... 73/49.2 |
| 4,756,184 | A | | 7/1988 | Reishus et al. |
| 4,771,804 | A | * | 9/1988 | Morales ........................ 137/412 |
| 4,813,275 | A | * | 3/1989 | Castor ......................... 73/49.2 |
| 4,827,762 | A | * | 5/1989 | Hasselmann .................. 73/49.2 |
| 4,862,734 | A | * | 9/1989 | Elderton ...................... 73/49.2 |
| 4,929,929 | A | * | 5/1990 | Romer ......................... 340/613 |
| 4,954,756 | A | | 9/1990 | Wood et al. |
| 5,088,317 | A | * | 2/1992 | Jensen ......................... 73/49.2 |
| 5,131,264 | A | * | 7/1992 | Jensen ......................... 73/49.2 |
| 5,132,923 | A | * | 7/1992 | Crawford et al. .............. 702/51 |
| 5,156,042 | A | * | 10/1992 | Carlin et al. .................. 73/49.2 |
| 5,315,873 | A | * | 5/1994 | Jin ............................. 73/309 |
| 5,479,939 | A | | 1/1996 | Ogino |
| 5,551,290 | A | * | 9/1996 | Spiegel ........................ 73/311 |
| 5,614,672 | A | * | 3/1997 | Legendre et al. .............. 73/437 |
| 5,646,560 | A | * | 7/1997 | Nguyen ........................ 327/109 |
| 5,921,025 | A | * | 7/1999 | Smith .......................... 47/79 |
| 5,921,428 | A | | 7/1999 | Rodgers |
| 5,938,985 | A | * | 8/1999 | Rodgers ....................... 261/131 |
| 5,981,881 | A | | 11/1999 | Kawanishi et al. |
| 6,026,683 | A | * | 2/2000 | Lee ............................. 73/309 |
| 6,029,514 | A | * | 2/2000 | Adam et al. ................... 73/149 |
| 6,289,728 | B1 | * | 9/2001 | Wilkins ........................ 73/149 |

* cited by examiner

Primary Examiner—Hezron Williams
Assistant Examiner—David A. Rogers
(74) Attorney, Agent, or Firm—Allen, Dyer, Doppelt, Milbrath & Gilchrist, P.A.

(57) ABSTRACT

An apparatus and method for detecting water loss from a swimming pool includes a first container having an upper end, a lower end, an inner cavity and at least one opening allowing swimming pool water to flow in and out of said inner cavity; a substantially waterproof load cell positioned within the inner cavity of said first container, for measuring weight bearing thereon; and a second container having an upper end, a lower end, and an inner cavity closed to water flow, said second container positioned within the inner cavity of said first container having its lower end upon said load cell so as to bear weight thereon.

13 Claims, 2 Drawing Sheets

APPARATUS AND METHOD FOR DETECTING A LEAK IN A SWIMMING POOL

CROSS-REFERENCE TO RELATED APPLICATIONS

This application is a division of U.S. patent application Ser. No. 10/384,959, filed 10 Mar. 2003 and now abandoned, which is a division of U.S. patent application Ser. No. 10/006,556, filed 4 Dec. 2001 and is now U.S. Pat. No. 6,532,814. This application claims the benefit of Provisional Application No. 60/251,367, filed Dec. 5, 2000. Applications Ser. Nos. 10/384,959 and 10/006,556 are incorporated herein by reference.

FIELD OF THE INVENTION

The present invention relates to the field of swimming pools and spas and, more particularly, to an apparatus and method for detecting leaks in pools and spas. The invention is equally applicable to detecting leaks in other containers for liquids.

BACKGROUND OF THE INVENTION

Swimming pools and spas have become quite popular and are common not only in public facilities but also in private homes. Occasionally, a swimming pool or spa appears to be losing water and the owner must determine whether the loss is due to an undetected leak.

Pool and spa leaks in most cases are frustrating to diagnose. It is also quite time consuming to test a pool or spa for a leak, for example usually requiring two to three days of checking. Additionally, after a known leak has been repaired the pool or spa requires monitoring over a period of time to measure any incremental drop in pool level (due to loss of water) in inches or fractions of inch. Such monitoring is typically accomplished over at least a twenty four hour period.

It is well known throughout the pool industry that leak detection almost always requires burdensome and redundant monitoring to establish traceable leakage. Various types of interferences may hamper the monitoring effort, for example, rain, customer neglect, or travel distances for monitoring personnel.

SUMMARY OF THE INVENTION

With the foregoing in mind, the present invention advantageously provides an apparatus for detecting water loss from a swimming pool or spa. The apparatus comprises a first container, a substantially waterproof load cell, and a second container. The first container has an upper end, a lower end, an inner cavity and at least one opening allowing swimming pool water to flow in and out of the inner cavity. The substantially waterproof load cell is positioned within the inner cavity of the first container for measuring weight bearing thereon. The second container has an upper end, a lower end, and an inner cavity closed to water flow, the second container being positioned within the inner cavity of the first container having its lower end upon said load cell so as to bear weight thereon. This apparatus, of course, may be employed for leak detection of a liquid contained in any other large container, not just in pools and spas.

A method aspect of the invention is useful for detecting loss of a contained liquid from a container. The method comprises segregating a fractional volume of the contained liquid so as to extend above a surface of a total volume of contained liquid; weighing the fractional volume; holding the fractional volume segregated during a predetermined time; and detecting a sufficient increase in weight of the segregated fractional volume relative to the total volume during the predetermined time to thereby indicate loss of contained liquid due to a leak in the container.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
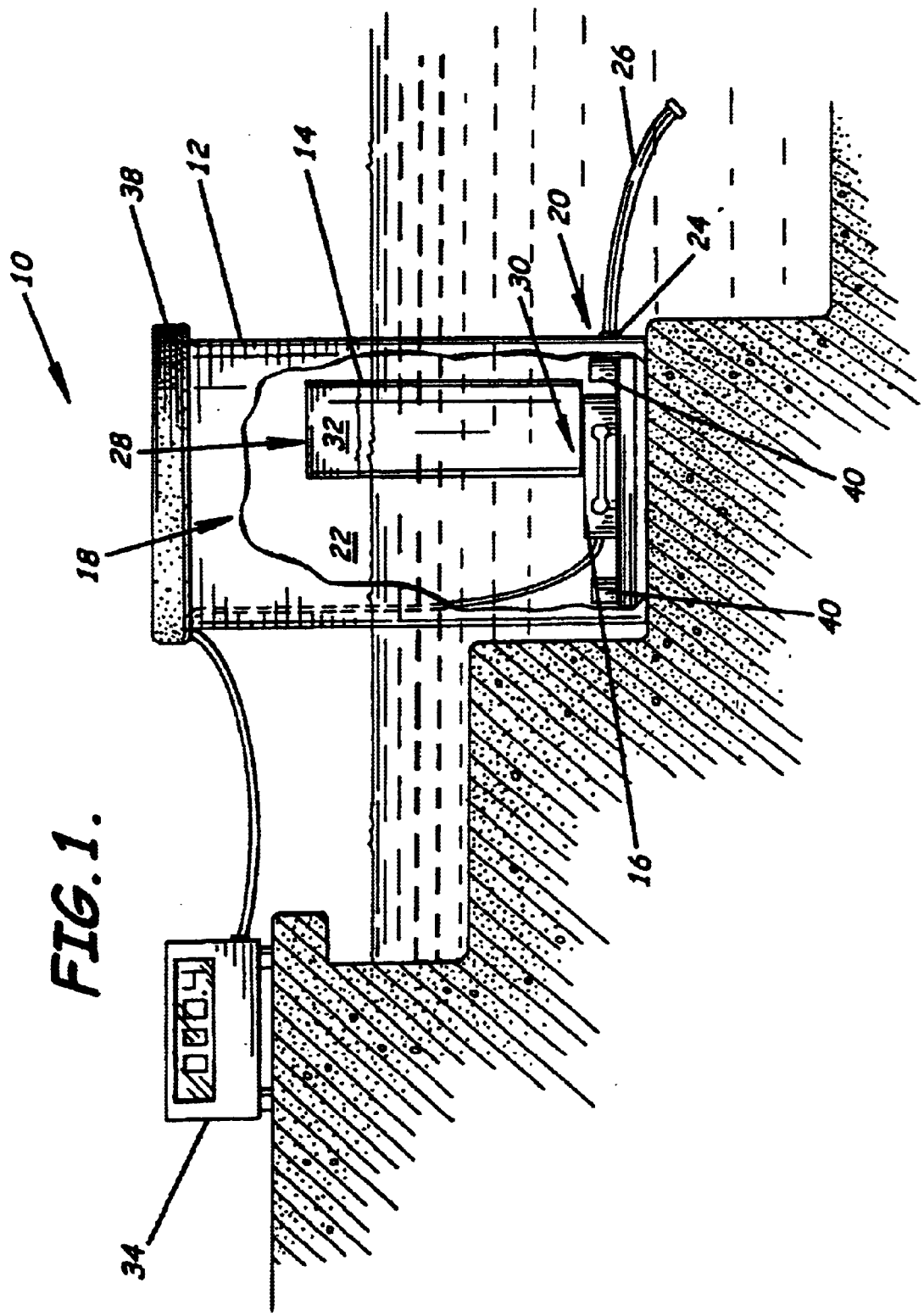
FIG. 1 is a side elevation schematic view of a prototype apparatus according to an embodiment of the present invention, wherein the apparatus is manually filled.
Figure 2:
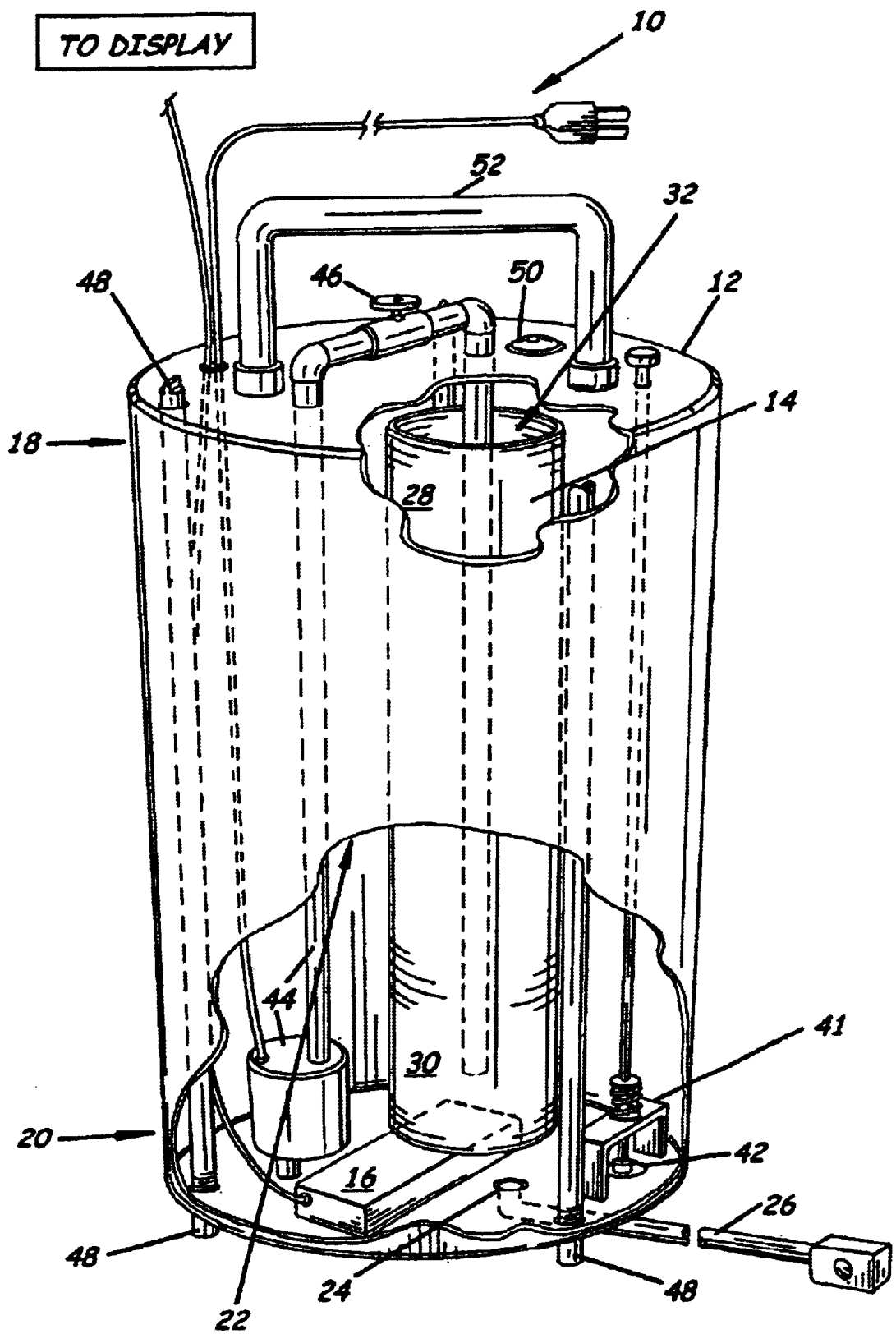
FIG. 2 is a cutaway perspective view of a preferred embodiment of the apparatus of FIG. 1 having a pump-aided fill.

FIGS. 1 and 2 illustrate an apparatus 10 for detecting water loss from a swimming pool according to the present invention. As best shown in FIG. 1, a preferred embodiment of the apparatus 10 comprises a first container 12, a second container 14 positioned within the first container, and a load cell 16 for weighing the second container 14. The first container 12 has an upper end 18, a lower end 20, and an inner cavity 22 having at least one opening 24 allowing swimming pool water to flow in and out of the inner cavity. This opening 24 is preferably near the lower end 20 of the container and includes a hose 26, as shown in FIG. 1. The load cell 16 is substantially waterproof and is positioned within the inner cavity 22 of the first container 12 for measuring weight bearing thereon. The second container 14 also has an upper end 28, a lower end 30, and an inner cavity 32, but the inner cavity 22 is closed to water flow. The second container 14 is positioned within the inner cavity 22 of the first container 12, and its lower end 30 bears upon the load cell 16 so as to place weight thereon. The apparatus 10 also preferably includes a power source (not shown) connected to the load cell 16 to thereby provide power. The skilled will appreciate that the submersible load cell 16 is substantially waterproof for use in a preferred embodiment of the invention. Additionally, a display 34 may be connected to the load cell 16 for displaying weight measured so that an operator may monitor the apparatus 10. The invention also comprises a processor (not shown) connected to the load cell 16 for processing weight measurement information.

As shown in FIG. 1, the upper end 18 of said first container 12 preferably has an opening connecting with said inner cavity 22 and includes a cover 38 thereon. The load cell 16 further comprises ballast sufficient for holding said load cell submerged underwater, as illustrated in FIG. 1. Of additional advantage is a load cell 16 further comprising an alarm responsive to said load cell and a recorder responsive to said load cell.

FIG. 2 illustrates an embodiment of the present invention which incorporates a number of features not shown in the model of FIG. 1. The additional features described below have been incorporated in order to make the invention more easily workable in the field, and also so as to simplify training personnel in the proper use of the invention.

As shown in FIG. 2, the apparatus 10 includes a first container 12, the outer container, having a substantially closed upper end 18, a lower end 20, an inner cavity 22 extending within said container from the upper end to the lower end, and an opening 24 at the lower end including a valve 41 thereon for allowing swimming pool water to flow in and out of said inner cavity. A substantially waterproof load cell 16 is positioned within the inner cavity 22 of said first container 12 at the lower end 20 and is connected to a power source (not shown), for measuring weight bearing thereon. A second container 14, the inner container, has an upper end 28, a lower end 30, and an inner cavity 32, and is positioned within the inner cavity 22 of said first container 12 having its lower end 30 upon said load cell IBso as to bear weight thereon. A water pump and siphon tube combination 44 having an air bleed valve 46 fluidly connects the inner cavity 22 of said first container 12 with the inner cavity 32 of said second container 14 for filling said second container with water. The air bleed valve 46 is also useful when removing the apparatus 10 from the water, so as to close the bleed valve to let water flow out of the apparatus by back-siphon through the opening 42 in the lower end of the first container 12. As shown, the apparatus 10 also includes a plurality of adjustable support members 48 connected to said first container 12 so as to allow leveling of the apparatus. Also included is a leveling indicator 50 preferably positioned at the upper end 18 of the first container 12 for ascertaining that the apparatus 10 is properly leveled during operation. A handle 52 is provided connected to said first container 12 for aiding in handling the apparatus 10.

Those skilled in the art will recognize that while a preferred embodiment of the invention has been described by way of example in reference to a swimming pool or spa, the invention is adaptable to detecting a fluid loss in many other large containers for liquids.

Additionally, it should be understood that the apparatus 10 of the present invention may be employed as part of a plurality of like devices to monitor many pools or other contained liquid bodies at the same time from a remote monitoring station. For example, the apparatus 10 may comprise a processor (not shown) connected to the load cell 16, and having sufficient storage capacity for storing weight measurement information generated by said load cell. Stored information is preferably stored in a computer readable medium. Also, the apparatus 10 may further include a wireless transmitter (not shown) connected to the load cell 16 for transmitting weight measurements and stored information to a remote monitoring station. In this manner, many such devices may be set up in pools throughout a city or region and be monitored from a central location. The wireless transmitter may be configured to communicate through a global computer network such as the internet for transmission of data, thus increasing the geographic range which may be monitored from a central monitoring station.

With reference to Table 1, a typical method of the present invention describes the typical process of initial set up, placement, and leak test using the apparatus 10 illustrated in FIG. 2. The initial set up involves making several connections, including connecting the equalizer hose to the first container 12, connecting power to the water pump and to the load cell and display. The air bleed valve may be opened to allow air inside the apparatus 10 to be expelled when water enters the device, although this is not necessary. The water intake valve is then opened to allow the first container 12 to be filled. The apparatus 10 is then placed into the pool, preferably on a pool step so that the apparatus is only partially submerged, as best shown in FIG. 2. Once placed into the pool, the first container 12 will fill with water to pool level. The apparatus 10 should then be checked to ensure that it is substantially leveled and not standing at an angle due to pool floor inclination. Leveling of the apparatus 10 is best verified by checking a bubble level gauge provided on the upper end of the first container 12, as shown in FIG. 2. If necessary, the leveling members may be adjusted to properly level the apparatus 10. The air bleed valve is then closed, and the water pump is energized so as to fill the second container 14 with water to a desired level, preferably just above the pool level, to thereby increase the weight of the water column volume segregated inside the second container 14 relative to the pool level. The water intake valve of the first container 12 is then closed, and the apparatus 10 is allowed to stabilize by waiting a few minutes. The load cell is energized and tared, that is, adjusted so that the display reads zero weight. It is then preferable to wait a few minutes to ensure that the apparatus 10 has stabilized, and that the load cell remains zeroed. At this time, the leak test is started by activating a timer and recording weight measurements by the load cell. It should be understood that the weight measurements and the recording thereof may be made on a continuous basis, or at predetermined time intervals.

TABLE 1

Typical Method of the Invention

Start Initial Set up

A) Connect Equalizer Hose
B) Connect Water Pump to Power
C) Connect Load Cell to Power and Display
D) Open Air Bleed Valve
E) Open First Container Water Intake Valve Placement A) Place Apparatus into Pool
B) Allow First Container to Fill to Pool Level Adjustment A) Adjust Leveling Members and
B) Verify Apparatus Level by Indicator
C) Close the Air Bleed Valve
D) Energize Water Pump and Fill Second Container to above Pool Level
E) Close First Container Water Intake Valve
F) Allow Time for Apparatus to Stabilize
G) Energize Load Cell and "Tare" by Adjusting to Display Zero Weight
H) Allow Time to Ensure Load Cell Is Stable
I) Readjust to Zero If Necessary Leak Test A) Start Timing the Leak Test and
B) Record Weight Readings over Time
C) No Weight Increase Indicates No Leak: Stop
D) Weight Increase Indicates Leak: Fix Leak and Repeat from Start It is possible that in a pool which has a severe leak the water level is decreasing at such a pace that it may be difficult to initially stabilize the reading of the load cell at zero when beginning a leak test. In such a situation, optionally, once the first container 12 is filled to pool level the equalizer hose may be closed or raised above the pool water level to stop outflow of water into the pool. Once the equalizer hose is opened or released into the water, the load cell will begin to register an increase in weight for the second container 14, signaling a severe leak.

In the method of the invention, a leak test may be run for any desired length of time. Experience indicates, however, that running a leak test for a few minutes is sufficient to detect all or nearly all leaks. In many cases, a leak test of only a few hours is entirely adequate for detecting a leak. Once an operator has accumulated certain experience with the apparatus 10, the time period for an adequate leak test will become apparent according to circumstances, as well as whether a test reading may need to be repeated.

Another aspect of the method of the present invention is detection of loss of a contained liquid from a container other than a pool or spa. This method, illustrated in FIG. 1, comprises segregating a fractional volume of the contained liquid so as to extend above a surface of a total volume of contained liquid; weighing the fractional volume; holding the fractional volume segregated during a predetermined time; and detecting a sufficient increase in weight of the segregated fractional volume during the predetermined time to thereby indicate loss of contained liquid due to a leak in the container.

Additional aspects of a preferred method of the invention include processing information generated during weighing; displaying the weight of the fractional volume; and displaying a change in weight of the fractional volume. Also, it should be understood that weighing in the method comprises submerged weighing in the contained liquid, and that submerged weighing preferably comprises weighing under liquidproof conditions. Detecting may also further comprise processing information generated during weighing. For most efficient monitoring of the method by an operator, the method may include recording responsive to weighing, recording responsive to detecting, and signaling an alarm responsive to detecting. Other aspects of the method include storing in a computer readable medium information generated during weighing, and wirelessly transmitting information generated during weighing to a remote monitoring station.

The following is a typical example of a preferred embodiment of the invention in operation, the apparatus 10 comprising the following described component parts, with reference to FIG. 1.

A main holding tank or first container 12, for which a standard 5-gallon plastic bucket with handle could be used. Typical dimensions are about 18 inches tall, about 11 inches in upper end diameter, and about 10 inches in lower end diameter.

An equalizer hose 26 for connection to an opening 24 near the lower end of the first container 12. This is typically a ¼ inch internal diameter, reinforced vacuum hose having a length of about between four to eight feet.

A submersible load cell 16 and appropriate mounting and ballast. Experimental work with load cells from various manufacturers revealed that Tedea-Huntleigh 1 KG max., #1024 T, and Revere SHB series 5 KG max. load cells measuring tenths of a gram throughout their range are most useful in the present invention. Typical measurements for such load cells are about 6 inches in length, about 1–2 inches in height, and up to about 1 inch in width. The load cell 16 is best disposed with about a 10 foot long cord to connect to a remote electronic read out. The load cell 16 may be mounted on a ½ inch thick piece of PVC, having an 8.5×8.5 inch octagon cut as a base. The top plate mounted on the load cell is about 4.5 inches square, and ⅛" thick clear plastic. The PVC base has sufficient remaining surface area around the load cell 16 to accommodate lead ballast weights for maintaining the load cell submerged. In addition, the ballast is needed to keep the plastic bucket (first container 12) solidly in place at least partially submerged and to combat the inherent buoyancy of the bucket when resting on the bottom of the pool.

An electronic readout display 34 and battery unit (not shown) are wired to the load cell. This unit preferably has internal specifications for typical scale use in weighing. The unit uses zero reset (also known as tare), and can be operated with or without an interval timer. The calibration on a preferred LED display operates from 0.0 to 1 KG, in tenths of gram increments. A model which has been found to perform adequately is the Tara systems TR 1 NK, 12 volt, adapted to connect in the present apparatus.

A weighing cylinder, or second container 14, must be chosen of an appropriate height depending on the water level in the pool to be tested. Typically, this second container 14 will have an open top, and a sealed bottom so that water does not come in and out of the containers inner cavity. Second containers ranging in height to accommodate water levels from about 4 inches to about 17 inches have been used in this invention.

A wind protective cover 38 is typically made of open cell polyurethane foam, and having a diameter sized snugly to cover entire top of the first container 12 holding tank. The cover 38, however, may be made of any one of many suitable materials and may have any desired thickness.

Set up and operation of the apparatus 10 in a typical leak test is as described above for the method of the invention. Experimental results during operational testing indicate that surface fluctuations in the water would adversely affect the small measurements required in this process. The typical swimming pool experiences such fluctuations due to wind and air currents, resulting in random and localized fluctuations in the water level. A slight breeze produces dramatic changes in the water surface, even though not seen by the naked eye. Therefore, baffling is advantageous for suppression of such uncontrolled water level fluctuations and is provided by the first container 12, which forms an outer barrier to these fluctuations. In a preferred embodiment this baffling is aided by the equalizer hose 26 connected to the opening near the lower end of the first container 12. The equalizer hose is most advantageously deployed when extending to the very bottom, or deepest part of the pool. Optionally, in situations where extreme fluctuations are encountered, the equalizer hose 26 may be provided with a dampener to help prevent undue fluctuations in water level within the first container 12.

The load cell 16 is positioned on the bottom of the first container 12. The second container 14, or weighing cylinder, is then filled with water preferably to just above pool level, and is gently lowered onto the load cell plate. In a preferred embodiment of the present invention, the second container 14 is filled until the LED display preferably reaches up to about 300 grams, and up to about 5 minutes is allowed for the water level to stabilize inside the first container 12, or holding tank, via the equalizer hose 26. The beginning water level in the swimming pool is then represented by the weight displayed for the second container 14 at this starting point. A wind protective cover 38, is then positioned to aid in preventing wind generated surface turbulence.

In operation, if the pool experiences a drop in water level due to volume loss, the water level inside the first container 12 will also drop by outflow through the equalizer hose 26.

As the first container 12 water level depletes along with the pool loss, the weight of the second container 14 on load cell 16 plate increases relative to the first container 12. Consequently, the load cell 16 detects the change in weight, and the display 34 will thus indicate even very small changes in the water level.

The apparatus 10 may be left in the pool while the leakage is traced and repaired. Experience with the invention has shown that if the display stops indicating a change in weight and is stable for at least about ten to fifteen minutes it is reasonable to assume that the leak has been successfully repaired. Further monitoring is generally not necessary from this point. However, if the display 34 continues to show a slow increase in weight, this is an indication that one or more leaks remain.

EXAMPLE

The following is offered as a further example of apparatus 10 calibration and leak detection. A typical pool that is losing about one inch of water level a day drops approximately 0.0007 inch per minute, there being 1,440 minutes in one day. In order to approximate such a loss, it was calculated that the first container 12 has a surface area of about 615 sq.cm. This surface area is adjusted by subtracting the calculated surface area of the second container 14, or 79.5 sq.cm., as this fits within the first container 12. The total remaining surface area of the first container 12 is, thus, 536 sq.cm.

The apparatus 10 as shown in FIG. 2 was tested in a simulation. The apparatus 10 was set up outside a pool, the first container 12 being filled with water to simulate water in a pool or spa. The load cell 16 and second container 14 were set up as described above, and the test simulation was begun by using a syringe to extract 0.7 cc of water from the first container 12. Within about one minute thereafter the display 34 indicated that the load cell 16 had detected a weight change of 0.1 g. Calculating based on the known dimensions of surface area in the first container 12, had the test actually been run in a typical pool, the load cell 16 would have detected a change of approximately 0.0005 inch in water level.

The apparatus 10 was further tested in a pool holding about 19,000 gallons of water. The tested unit was installed on block supports inside the vinyl liner pool. Due to the pronounced angle of the bottom the unit was leveled to balance a leaning offset. Wind was blowing in gusts of about between 5 to 15 MPH, thereby creating undesirable ripples and fluctuations along the pool surface. The apparatus 10 was set up generally as described above, and the load cell 16 was tared to zero after the apparatus was set up. A leak was then simulated in the pool by removing 1 gallon of water from the pool with a bucket. Within about one minute, the display registered an increase in weight of 0.4 grams. The gallon of water was then poured back into the pool, and the display returned to zero within about 2 minutes. In this experimental example the apparatus 10 of the present invention detected a drop in volume of about $1/19000$, and under wind conditions tending to generate adverse surface fluctuations.

In view of the above description and examples, those skilled in the art will appreciate that the present invention will materially enhance the quality of the environment by providing an apparatus and method for easily detecting water leaks from swimming pools.

Water consumption by recreational water use has become an increasingly acute concern in many parts of the country where water shortages are experienced due to population growth. The invention will make a positive impact in reducing water loss from leaking pools, and will thereby aid in slowing down demand for potable water in such areas, and in extending the viability of the water reservoir, be it an aquifer, or a water impoundment.

Those skilled in the art will recognize that it would be advantageous to have the load cell 16 be adjustably calibrated if necessary to account for natural evaporation of water from the swimming pool. In practice, it has been found that evaporation does not affect the performance the apparatus in detecting pool leaks. The reason or reasons for lack of effect by evaporation is not fully understood, however, at least two possible explanations may apply. First, it may be that evaporation affects the water in both the apparatus and the swimming pool equally, thereby not creating any detectable difference between the two. Second, it is also possible that natural evaporation is undetectable because it proceeds at a rate slow enough not to be measured within the relatively short monitoring periods when the present apparatus is used.

Accordingly, in the drawings and specification there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An apparatus for detecting loss of liquid from a body of contained liquid having a surface, said apparatus comprising:

a first container having an upper end, a lower end, an inner cavity and at least one opening allowing contained liquid to flow in and out of said inner cavity when said first container is partially submerged in the contained body of liquid with the container upper end extending above the surface of the contained liquid so that a liquid surface forms in the first container level with the surface of the contained liquid;

a load cell submersible in the contained liquid and positioned at a lower end of said first container within the inner cavity, for measuring a weight bearing thereon; and a second container having an upper end, a lower end, and an inner cavity closed to liquid flow, said second container positioned within the inner cavity of said first container having its lower end resting upon said load cell so as to bear no detectable weight thereon when the second container's inner cavity is filled with a volume of the contained liquid to a level even with the surface of the contained body of liquid.

2. The apparatus of claim 1, further comprising a power source connected to said load cell.

3. The apparatus of claim 1, wherein said submersible load cell is substantially liquidproof.

4. The apparatus of claim 1, further comprising a display connected to said load cell for displaying weight measured by said load cell.

5. The apparatus of claim 1, further comprising a processor connected to said load cell for processing weight information generated by said load cell.

6. The apparatus of claim 1, wherein the upper end of said first container has an opening connecting with said inner cavity and includes a cover thereon.

7. The apparatus of claim 1, further comprising sufficient ballast for holding the apparatus at least partially submerged in liquid.

8. The apparatus of claim 1, wherein the opening in said first container is positioned near the lower end.

9. The apparatus of claim 1, wherein the opening further comprises a hose extending therefrom.

10. The apparatus of claim 1, further comprising an alarm responsive to said load cell.

11. The apparatus of claim 1, further comprising a recorder responsive to said load cell.

12. The apparatus of claim 1, further comprising a processor connected to said load cell, said processor including sufficient storage capacity for storing weight information generated by said load cell.

13. The apparatus of claim 1, further comprising a wireless transmitter connected to said load cell for transmitting weight information to a remote monitoring station.

* * * * *